March 5, 1968 J. E. HARRISON ETAL 3,372,339
COMMUNICATION SYSTEM INCLUDING FREQUENCY SYNTHESIZER SYSTEM
Filed Aug. 17, 1964
5 Sheets-Sheet 1

INVENTORS
JOHN E. HARRISON
FLOYD A. KOONTZ
THOMAS B. MICHAELS
BY Martin LuKacher
ATTORNEY March 5, 1968 J. E. HARRISON ETAL 3,372,339

COMMUNICATION SYSTEM INCLUDING FREQUENCY SYNTHESIZER SYSTEM

Filed Aug. 17, 1964 5 Sheets-Sheet 2

March 5, 1968 J. E. HARRISON ETAL 3,372,339

COMMUNICATION SYSTEM INCLUDING FREQUENCY SYNTHESIZER SYSTEM

Filed Aug. 17, 1964

5 Sheets-Sheet 3

INVENTORS
JOHN E. HARRISON
FLOYD A. KOONTZ
THOMAS B. MICHAELS

BY Martin L. Kael
ATTORNEY

INVENTORS
JOHN E. HARRISON
FLOYD A. KOONTZ
THOMAS B. MICHAELS

BY [signature]
ATTORNEY

INVENTORS
JOHN E. HARRISON
FLOYD A. KOONTZ
THOMAS B. MICHAELS
BY Martin LeKacher
ATTORNEY United States Patent Office 3,372,339
Patented Mar. 5, 1968

3,372,339
COMMUNICATION SYSTEM INCLUDING FREQUENCY SYNTHESIZER SYSTEM
John E. Harrison, Rochester, Floyd A. Koontz, Penfield, and Thomas B. Michaels, Rochester, N.Y., assignors to General Dynamics Corporation, a corporation of Delaware
Filed Aug. 17, 1964, Ser. No. 390,111
12 Claims. (Cl. 325—421)

ABSTRACT OF THE DISCLOSURE

A communication system is described having an RF and IF channel. A frequency synthesizer provides injection signals for translating RF signals into IF signals or vice versa. The synthesizer is controlled in part by a digital frequency counter, the input of which is connected to a reference frequency signal generator and the output of which is connected to a mixer. The counter is controlled by the frequency selection knobs which select the lower order digits of a number which represents the frequency to which the system is to be tuned (100 kc., 10 kc. and 1 kc. digits), such that the mixer receives a frequency having the selected lower order digits. The synthesizer also includes a switched crystal oscillator, the output of which is connected to an error canceling loop which includes the mixer to which the portion of the synthesizer having the digital frequency counter is connected. Other mixers are provided in the error canceling loop in which signals from the reference frequency generator are combined to provide the output injection signal from an output mixer in the error canceling loop. Selectable filters are included in the loop for reversing the direction of error cancellation therein, whereby to double the number of frequencies which are generated. The injections to the other mixers in the loop are controlled by the tuning controls of the system so that lower order digits of the frequency of the output injection signal are variable by the lower order digit counter controls independently of any variation in the higher order digit controls.

Figure 1:
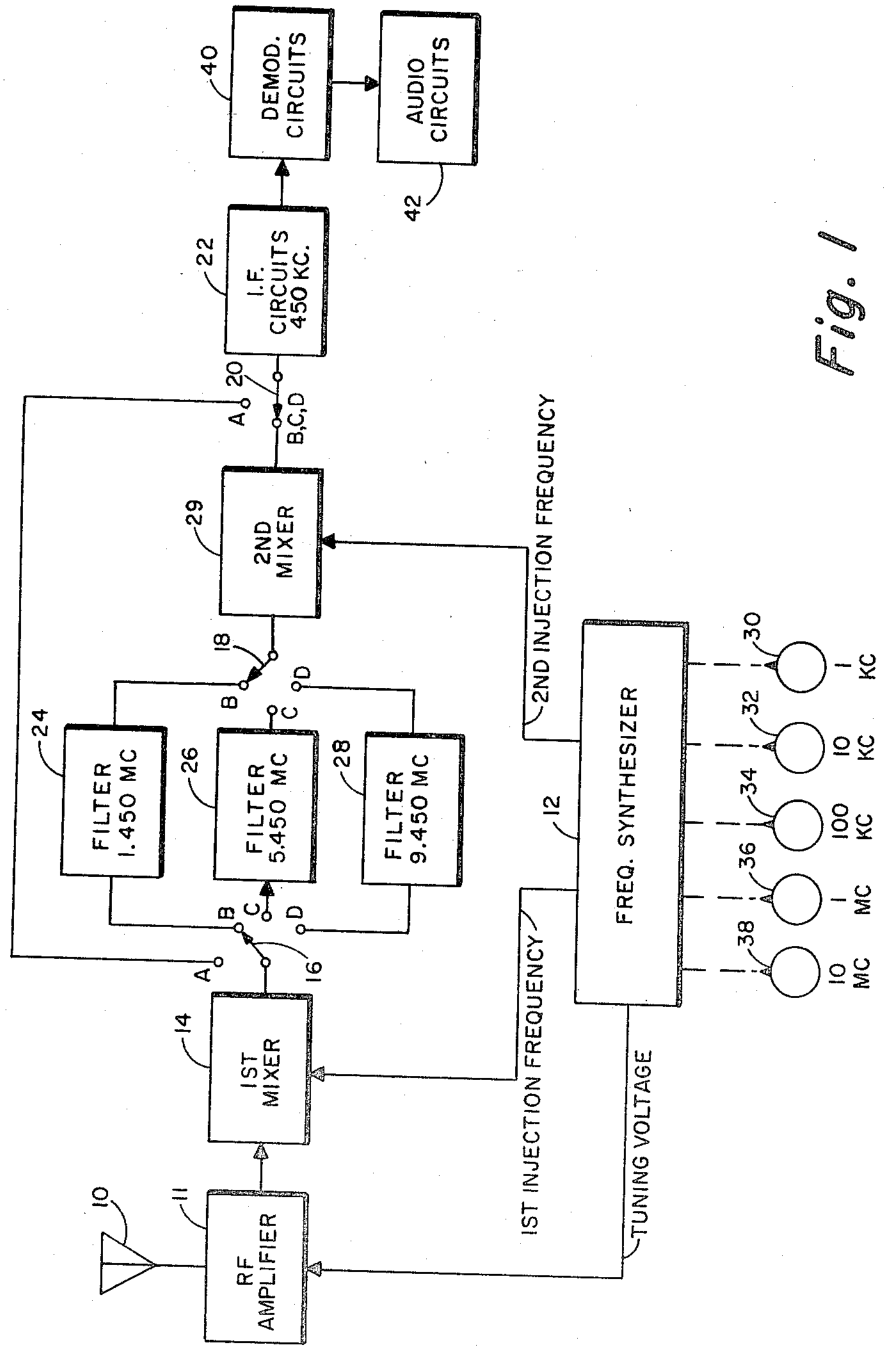

The present invention relates to communications systems, and more particularly to systems for translating signals in frequency from radio frequencies to intermediate frequencies or vice versa.

The invention is especially suitable for providing a system for synthesizing a signal having any selected one of a large number of frequencies over a wide band of frequency. The synthesized signal may be injected into a frequency translator for translating a received radio frequency signal into an intermediate frequency signal or for translating an intermediate frequency signal into a radio frequency signal which may be transmitted.

In order to cover a wide range of frequencies, a superheterodyne radio set capable of synthesizing injection frequencies over a wide range of frequencies is desired so that any received frequency can be translated to the set IF frequency or the set IF frequency can be translated into any desired RF frequency for transmission. Frequency synthesizers for generating the wide range of injection frequencies to enable the desired frequency translations have generally been complex devices.

Most known frequency synthesizers are capable of directly synthesizing only a narrower band of frequencies than is needed. Some radios require separate synthesizers operative in successive frequency bands in order to cover the desire to wide range of frequencies. The more complex the synthesizer, the greater the possibility of generating spurious frequencies which can result in the reception and/or transmission of unwanted signals.

It is an object of the present invention to provide an improved communication system for the transmission and reception of radio signals over a wide range of frequencies.

It is another object of the present invention to provide improved communication apparatus having simplified frequency translating means.

It is a further object of the present invention to provide communications apparatus in which frequency errors are reduced so that received and/or transmitted signals have accurate frequencies.

It is a still object of the present invention to provide a communication system adaptable to digital control and which can readily make use of digital circuit techniques.

It is a still further object of the present invention to provide a communication system for receiving or transmitting radio signals which may have closely spaced frequencies over a wide range of frequency and which may be rapidly tuned to any selected one of such frequencies.

It is a still further object of the present invention to provide an improved frequency synthesizer system which is operative over a wide range of frequencies and in which the generation of spurious frequencies is reduced.

Briefly described, a communication system incorporating the present invention includes a channel for handling a wide range of frequencies, say radio frequencies, and a channel for handling a certain frequency such as an IF frequency. Frequency translating means are provided for translating the IF frequency signal into an RF signal of desired frequency for transmission or for translating an RF signal of desired frequency into an IF signal. Signals are injected into the frequency translating means for accomplishing the desired frequency translation. Such injection signals may be synthesized so as to have any selected one of a plurality of frequencies over the required wide frequency range. To this end, certain signals are generated having frequencies, at least the lower order digits of which, are variable in digital steps. The control of the frequency of these signals in digital steps may be accomplished by counting the oscillations from a signal generator in a counter. The counter is digitally controlled to provide an output of a certain frequency, when the generated signals have the desired frequency. The signal generator is controlled to produce the desired frequency by comparing the output of the counter with precise reference frequency signals. Thus, the generated signals have the same accuracy as the reference signals. The generated signals are then translated in frequency to the desired injection frequency by mixing the generated signals with signals derived from the reference frequency source. The lower order digits of the injection frequency as well as the higher order digits of the injection frequency are then accurately controlled in digital steps since they are derived with reference to the same standard, i.e., the reference frequency signals. Digital controls for the counter may be integrated with the controls for tuning a radio set so that the system may transmit or receive signals of the desired frequency over a wide range of frequencies.

Figure 2:
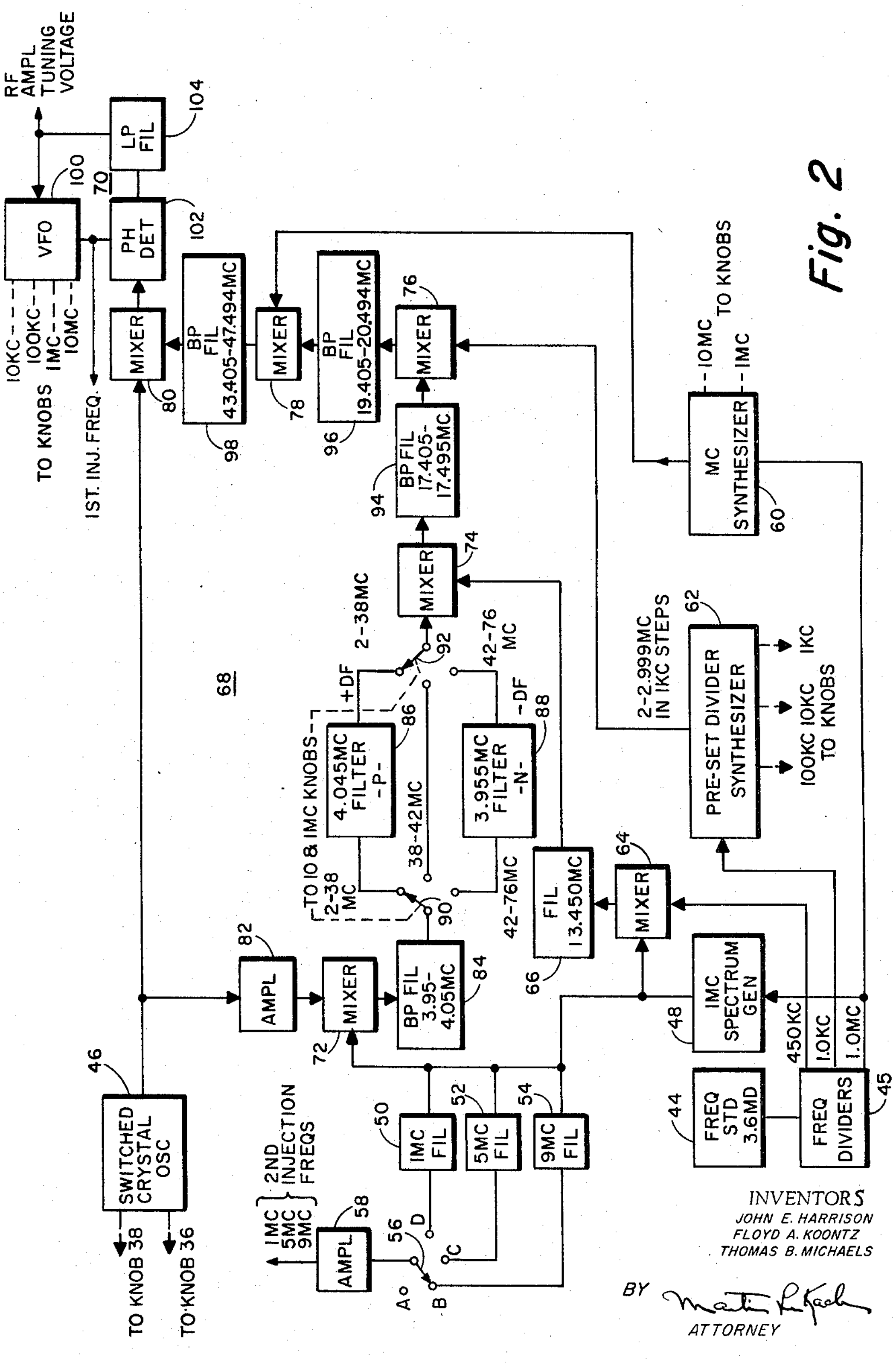
Figure 3:
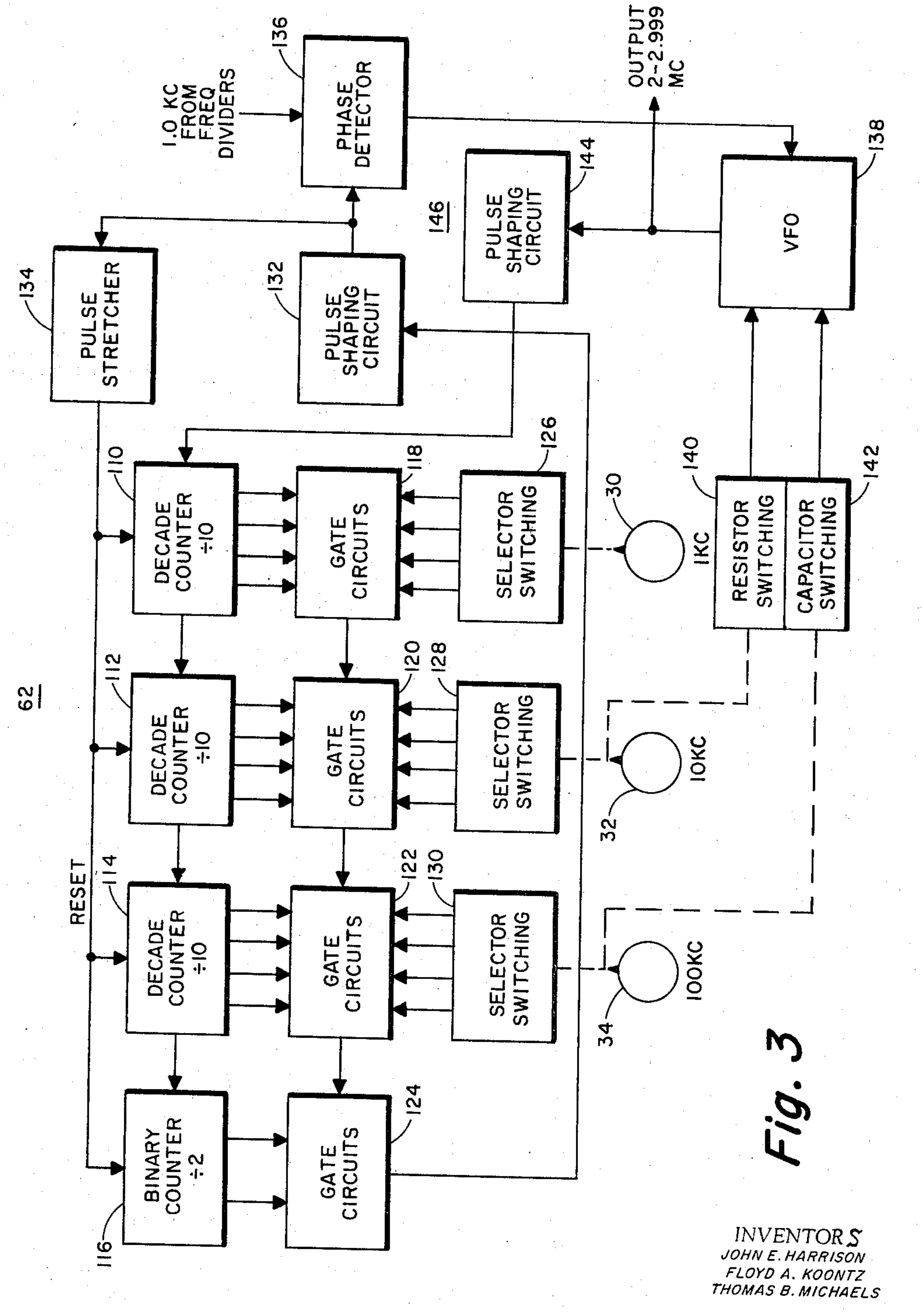
Figure 4:
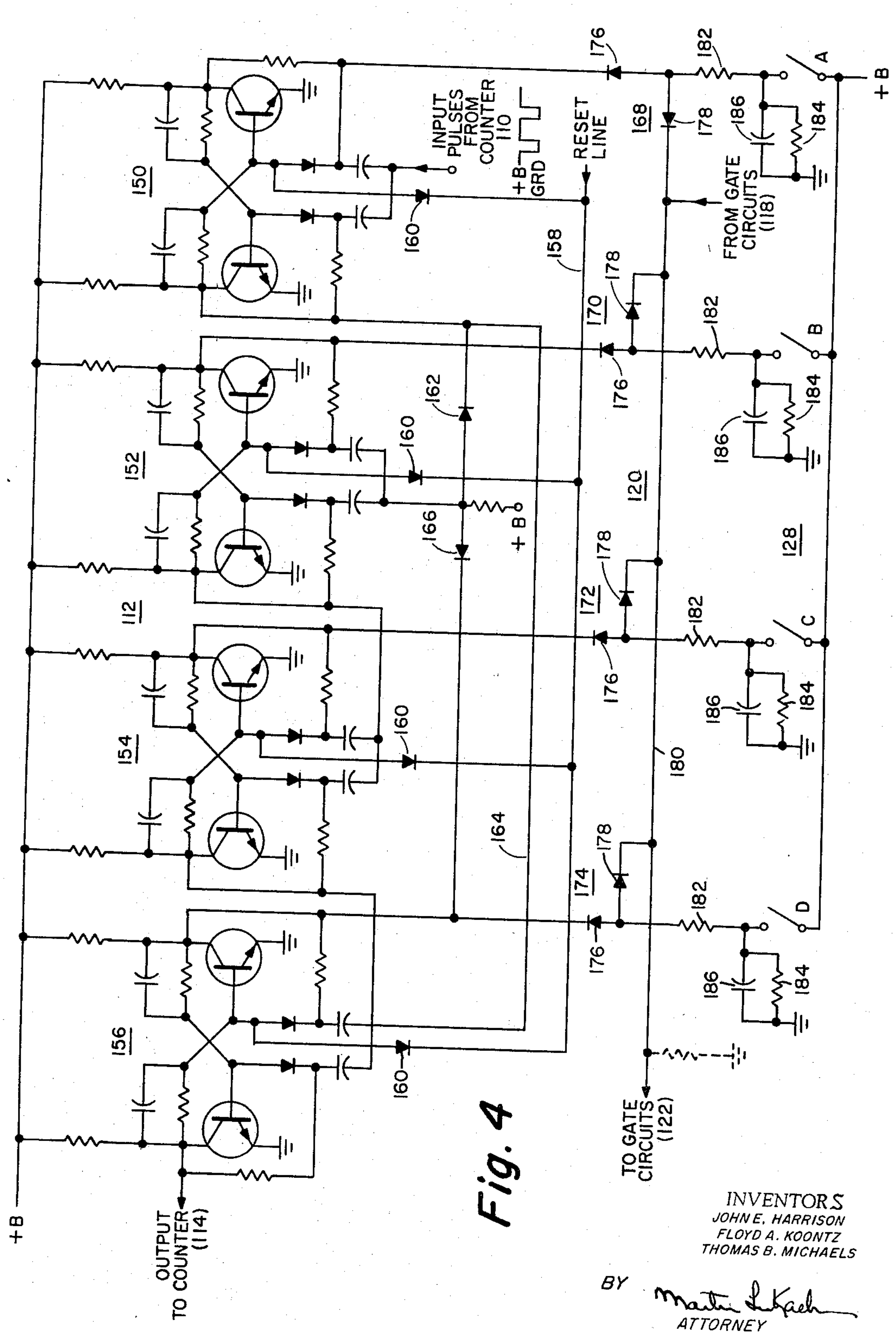
Figure 5:
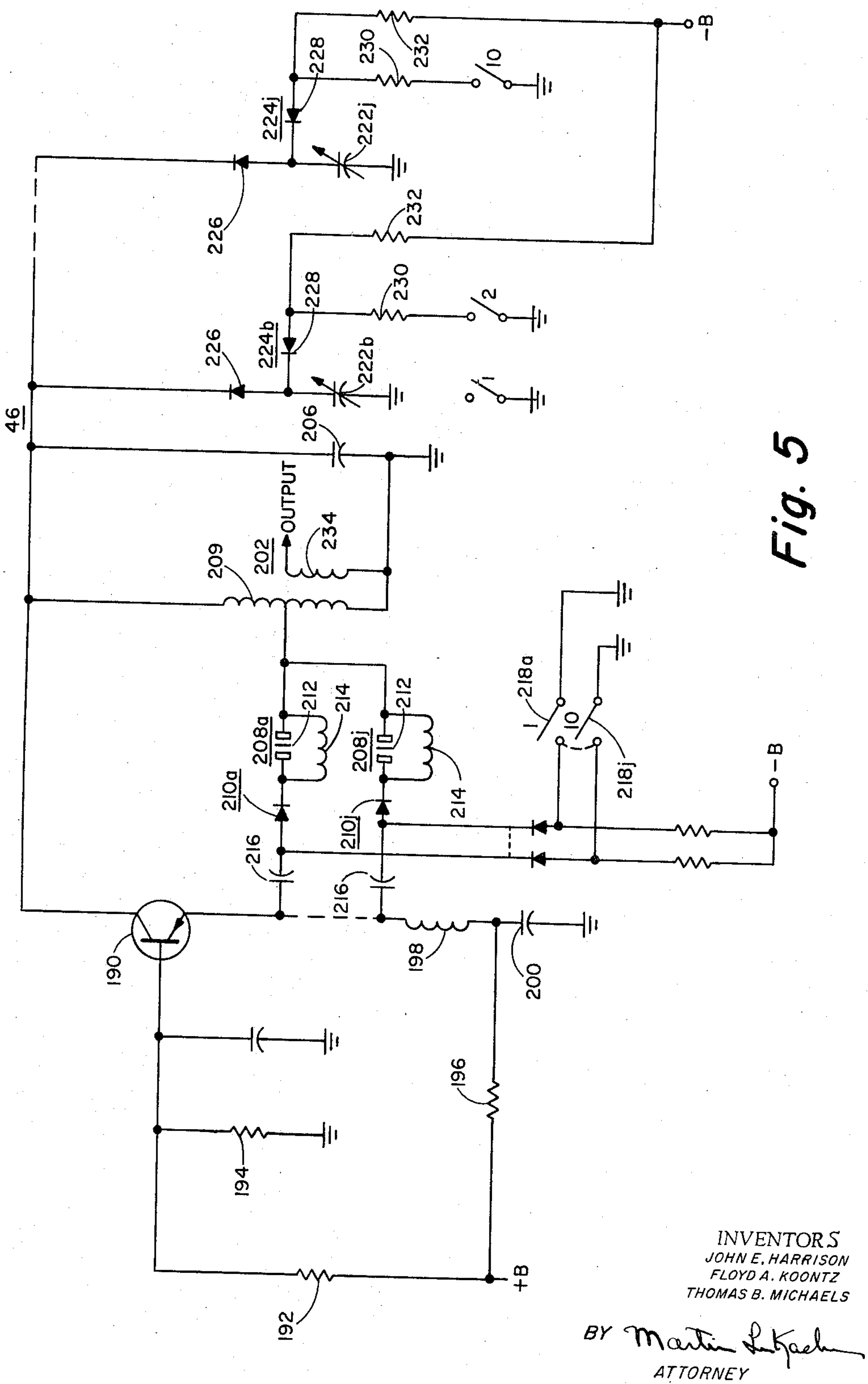

The invention itself, both as to its organization and method of operation, as well as additional objects and advantages thereof will become more readily apparent from a reading of the following description in connection with the accompanying drawings in which:

FIG. 1 is a block diagram of a radio set incorporating the invention,

FIG. 2 is a block diagram of a frequency synthesizer system which may be used in the radio set shown in FIG. 1, FIG. 3 is a block diagram of a preset divider frequency synthesizer which is used in the frequency synthesizer system in FIG. 2, FIG. 4 is a schematic diagram of a decade counter, associated gate circuits and control circuits which counter, gate circuits and control circuits are used in the preset divider synthesizer shown in FIG. 3, and FIG. 5 is a simplified, schematic diagram of a crystal oscillator including switching means for selecting any one of a plurality of output frequencies, which oscillator is used in the synthesizer shown in FIG. 2.

Referring more particularly to FIG. 1 of the drawings, there is shown a high-frequency radio receiver adapted to cover the frequency band from 2 mc. to 76 mc. It will be appreciated that the principles of the invention are equally applicable to a radio transmitter as well as to other forms of communication systems. The description is limited to a radio receiver so as to simplify the explanation of the invention. An antenna 10 is coupled to an RF amplifier 11 which may be tuned to any selected one of a large number of frequencies over the band. This tuning is accomplished electronically by means of a tuning voltage applied to the amplifier tuned circuits from a frequency synthesizer 12. The frequency synthesizer 12 also supplies a first injection frequency to a frequency converter or translator device called a first mixer 14. The frequency selected and transmitted by the RF amplifier is also applied to the mixer 14.

The mixer provides any one of four output frequencies called first IF frequencies. These frequencies are 450 kc., 1.450 mc., 5.450 mc., and 9.450 mc. As the description proceeds certain frequencies and frequency relationship will be given, solely by way of example. The frequency synthesizer 12 provides four different ranges of injection frequencies to obtain the four IF frequencies mentioned above. These ranges are referred to as Bands A, B, C and D, respectively. The following Table I shows the relationship between these frequency bands, the system frequencies which are passed by the RF amplifier, the first injection frequency from the synthesizer 12, and a second injection frequency also provided by the synthesizer and which will be mentioned hereinafter.

TABLE I

| Band | System Freq. (mc.) | 1st Injection Freq. (mc.) | 2nd Injection Freq. (mc.) |
|---|---|---|---|
| A | 2-5.999 | 2.450-6.449 | ---------- |
| B | 6-29.999 | 7.450-31.449 | 1.0 |
| C | 30-49.999 | 35.450-55.944 | 5.0 |
| D | 50-75.999 | 59.450-85.449 | 9.0 |

Band switches 16, 18 and 20, which may be ganged with each other, are provided to select the proper band. For Band A (450 kc.), the IF frequency provided by the first mixer, is applied directly to intermediate frequency (IF) circuits 22, which may include amplifiers and the like. These circuits are tuned to 450 kc. Three different filters 24, 26 and 28 respectively, for passing the frequency corresponding to Bands B, C and D, are provided between the first mixer 14, and the second mixer 29. The second mixer uses a second injection frequency from the frequency synthesizer, and translates the first IF frequencies corresponding to Bands B, C and D, to the second IF frequency (450 kc.) which is applied to an amplifier in the IF circuits 22.

The frequency synthesizer 12 is controlled by a plurality of tuning knobs 30, 32, 34, 36 and 38, respectively, for selecting the 1 kc., 10 kc., 100 kc., 1 mc. and 10 mc. decades of the frequency to be received by the receiver. The frequency synthesizer is also controlled by these tuning knobs to selectively provide the proper first injection frequency and second injection frequency, depending upon the desired received frequency selected by properly positioning the knobs 30 to 38. Thus, by means of these knobs, the tuning of the entire radio set may be readily accomplished. The frequency synthesizer will be described in detail in connection with FIG. 2 of the drawings.

The IF circuits 22 are connected to demodulating circuits 40, which may include product detectors, FM discriminators, or the like, depending upon the type of signal (FM, double sideband, etc.) which is to be received. The output of the demodulation circuits is applied to audio circuits 42, which may include audio amplifiers, speakers, if aural reception is desired. If FSK or other code type information is being received, the audio circuits 42 may include code demodulators, converters, and teletypewriters or the like.

It will be appreciated that the RF amplifier 11 defines a channel in the radio set which is adapted to handle a wide range of frequency, say 2 mc. to 76 mc. In the illustrative system shown in FIG. 1, the IF circuits 22 define a second channel which is adapted to transmit only the IF frequency. The frequency synthesizer 12 and mixers and filters provide translation means for converting the desired RF channel signal into a frequency which can be handled in the IF channel. When the system is adapted for transmitter purposes, the IF signal, suitably modulated, if desired, at low level in the audio circuits would be translated from IF frequency in the IF channel to the desired RF frequency for transmission by the antenna 10, the translation being accomplished by the frequency translation means provided by the frequency synthesizer 12, mixers 14 and 29, and their associated filters.

The frequency synthesizer itself is shown in FIG. 2. The first injection frequency, which may be any of a large number of frequencies spaced 1 kc. apart over the range of the system is synthesized from only two signals, namely a reference frequency signal supplied by a frequency standard 44, and a signal supplied by a switched crystal oscillator 46. The crystal oscillator 46 includes ten relatively inexpensive crystals which may be selected to produce any one of ten frequencies. The oscillator 46 will be described in detail hereinafter in connection with FIG. 5.

The synthesizer can produce signals having frequencies from 2.450 kc. to 85.449 mc., in 1 kc. steps, except for the ranges between 31.450 mc. and 35.449 mc. and between 55.450 mc. and 59.449 mc. The latter two ranges are not used in the exemplary radio set shown herein, because of the selected IF frequencies which shift 4 mc. and are obtained without injection frequencies in these ranges. By the addition of an eleventh crystal (12.045 mc.) in the oscillator 46 the synthesizer can produce frequencies in the two ranges noted above. Thus the entire frequency range is covered continuously in 1 kc. steps. The various frequencies generated in the synthesizer in covering the band from 2 mc. to 76 mc. are set forth in correlation with each other in Table II.

Since the crystals are free running, these frequencies may contain frequency errors. Nevertheless, the frequency synthesizer cancels such errors and insures that the first injection frequency has the same order of precision and accuracy as the frequency produced by the frequency standard 44.

The frequency standard 44 may be of the type known in the art and including a crystal controlled oscillator having its crystal contained in a temperature-controlled oven. Reference may be had to Van Sandwyk, Patent No. 3,071,676, issued Jan. 1, 1963, for a more detailed discussion of such frequency standards.

The frequency standard may include a pulse shaper circuit for driving a plurality of frequency dividers 45, including several frequency divider flip-flop chains connected in series with each other. The frequency standard, by way of example, provides a 3.6 mc. signal, which by means of the flip-flop stages is divided to a 450 kc. pulse train. A resonant tank circuit responsive to the 450 kc. pulse train may be used to convert the train into a sinusoidal wave at 450 kc. Similarly, additional flip-flop chains may be used to provide a 1 kc. output pulse train. A 1 mc. sinusoidal signal may be obtained by mixing 900 kc. and 100 kc. signals derived from different points of the flip-flop divider chain, tuned circuits being used to convert the pulse train into sinusoidal signals suitable for application to the mixer circuit for providing the 1 mc. signal.

The 1.0 mc., 1.0 kc. and 450 kc. signals are used in the frequency synthesizer as reference signals. The 1 mc. signal is also used to provide the second injection frequencies 1 mc., 5 mc., or 9 mc. A spectrum generator 48 which may be of the type known in the art for producing a wide spectrum of harmonically related components 1 mc. apart from each other, is supplied the 1 mc. reference signal from the frequency dividers 45. The output spectrum from the generator 48 is supplied to three band pass filter circuits 50, 52 and 54 respectively for passing 1 mc., 5 mc. and 9 mc. signals. A switch 56, which may be ganged with the band selection switches 16, 18 and 20 (FIG. 1) connects the output of a selected one of these filters to the input of an isolation or buffer amplifier 58. The amplifier is connected to the second mixer 29 (FIG. 1) and provides the requisite second injection frequencies depending upon the selected band, A, B, C or D.

The 1 mc. reference signal is also applied to a one mc. synthesizer 60 wherein the 1 mc. signal is converted into any one of four selected frequencies, namely 24 mc., 25 mc., 26 mc. or 27 mc., depending upon the position of the 10 mc. and 1 mc. knobs 38 and 36 (FIG. 1). The mc. synthesizer 60 may include a plurality of frequency multipliers and mixers which may be selectively switched into or out of the system to provide the requisite frequencies. Alternatively, the one mc. synthesizer may include a tunable voltage controlled oscillator of the type to be described more fully hereinafter. The oscillator is included in a phase-locked loop also including a divider circuit which may be pre-set to divide the output of the oscillator by a number depending upon desired output frequency from the synthesizer 60. The pre-set divider output is compared in a phase detector with the 1 mc. reference signal and the phase detector output is used to tune the oscillator. The oscillator will then be tuned to 24, 25, 26 or 27 mc., depending upon the setting of the divider.

The 1 kc. signal is applied as a reference signal for controlling a pre-set divider synthesizer 62. A pre-set divider synthesizer operates generally along lines of the alternative type of mc. synthesizer 60, described above. Detailed description of the pre-set divider synthesizer 62 will be present hereinafter in connection with FIGS. 3 and 4 of the drawings. The pre-set divider synthesizer is controlled by the 1 kc., 10 kc., and 100 kc. knobs 30, 32, and 34, so as to select any one of a 1,000 frequencies between 2.000 mc. and 2.999 mc. which are separated from each other by 1 kc. increments or steps.

The 450 kc. reference signal is translated to 13.450 mc. by mixing that signal with the spectrum output of the spectrum generator 48 in a mixer 64. The mixer 64 is followed by a filter 66 which may be a crystal filter which pases only the 13.450 mc. output of the filter which results from the combination of the 13 mc. spectrum component and the 450 kc. reference signal. A vernier adjustment of the 13.450 mc. signal may be provided by mixing the output of a tunable oscillator having a nominal frequency of 9.450 mc. and the output of the 9 mc. filter 54. The resulting 0.45 mc. signal, instead of the reference 450 kc. signal from the frequency dividers 46, is mixed with the spectrum in the mixer 64. The filter 66 has a band pass sufficient to pass a frequency deviation, for example, of 20 kc. The 13.45 mc. signal may therefore be provided with a deviation (+ or −) of 20 kc., depending upon the venier setting of the tunable 9.450 mc. oscillator.

The output of the switched crystal oscillator 46 and the reference frequency signals developed from the frequency standard 44 output, namely the mc. spectrum; the 13.45 mc. signal, the 2 to 2.99 mc. signal, and the 24 to 27 mc. signal, are combined with each other in an error-cancelling loop 68, which cooperates with a phase-locked loop 70, to provide the first injection frequency. Table II indicates the frequencies developed in the error-canceling loop 68 and from the phase-locked loop 70.

TABLE II

[All frequencies in mc.]

| Loop Filter | Received Freq. | Crystal Freq. | First Injection Freq. | Error Cancelling Loop Freq. | MC. Synth. (60) Freq. | |
|---|---|---|---|---|---|---|
| P | 2-2.999 | 44.045 | 2.450-3.449 | 46.495-47.494 | 27 | n.b. 1 |
| P | 3-5.999 | 40.045 | 3.450-6.449 | 43.495-46.494 | 24-26 | n.b. 2 |
| P | 6-9.999 | 36.045 | 7.450-11.449 | 43.495-47.494 | 24-27 | n.b. 3 |
| P | 10-13.999 | 32.045 | 11.450-15.449 | 43.495-47.494 | 24-27 | |
| P | 14-17.999 | 28.045 | 15.450-19.449 | 43.495-47.494 | 24-27 | |
| P | 18-21.999 | 24.045 | 19.450-23.449 | 43.495-47.494 | 24-27 | |
| P | 22-25.999 | 20.045 | 23.450-27.449 | 43.495-47.494 | 24-27 | |
| P | 26-29.999 | 16.045 | 27.450-31.449 | 43.495-47.494 | 24-27 | |
| P | 30-33.999 | 8.045 | 35.450-39.449 | 43.495-47.494 | 24-27 | n.b. 4 |
| P | 34-37.999 | 4.045 | 39.450-43.449 | 43.495-47.494 | 24-27 | |
| | 38-41.999 | ------------ | 43.450-47.449 | 43.450-47.449 | 24-27 | |
| N | 42-45.999 | 4.045 | 47.450-51.449 | 43.405-47.404 | 24-27 | |
| N | 46-49.999 | 8.045 | 51.450-55.449 | 43.405-47.404 | 24-27 | |
| N | 50-53.999 | 16.045 | 59.450-63.449 | 43.405-47.404 | 24-27 | n.b. 4 |
| N | 54-57.999 | 20.045 | 63.405-67.449 | 43.405-47.404 | 24-27 | |
| N | 58-61.999 | 24.045 | 67.450-71.449 | 43.405-47.404 | 24-27 | |
| N | 62-65.999 | 28.045 | 71.450-75.449 | 43.405-47.404 | 24-27 | |
| N | 66-69.999 | 32.045 | 75.450-79.449 | 43.405-47.404 | 24-27 | |
| N | 70-73.999 | 36.045 | 79.450-83.449 | 43.405-47.404 | 24-27 | |
| N | 74-75.999 | 40.045 | 83.450-85.449 | 43.405-45.405 | 24-25 | n.b. 5. |

N.b. 1—Other mc. synth. frequencies may be used and first injection frequencies to 0.001 mc. may be obtained N.b. 2—Only three mc. synth. frequencies are used because of IF selection.

N.b. 3—The following mc. synth. frequencies and loop frequencies are obtained:

24 mc.—[1] 43.495–44.494 [2] 43.405–44.404
25 mc.—44.495–45.494 44.405–45.404
26 mc.—45.495–46.494 45.405–46.404
27 mc.—46.495–47.494 46.405–47.404

N.b. 4—A 12.045 crystal frequency may be used for frequencies in bands which are not used because of IF selection.

N.b. 5—Other mc. synth. frequencies and 44.045 crystal may be used to synthesize frequencies to 92.449 mc.

[1] P—Loop Filter. [2] N—Loop Filter.

The error-cancelling loop 68 includes connections from the output of the switched crystal oscillator 46 to an initial one of a plurality of mixer circuits 72, 74, 76, 78 and 80 through an isolation amplifier 82. The output of the oscillator 46 is also connected to the final one of the mixers 80 to complete the loop 68. The initial and final mixers, 72 and 80 respectively, may be crystal mixers, whereas the remaining mixers 74, 76 and 80 may be balanced mixers. The initial mixer 72 also receives an input from the spectrum generator 48. Only those frequencies which result from the combination of the oscillator frequencies and spectrum components which lie within a pre-determined frequency band (3.95 mc. to 4.05 mc.) are selected by means of a band-pass filter 84. The resulting signals may include combinations of the spectrum components and the oscillator components in opposite senses (N and P). Should an oscillator frequency subtract from a spectrum component (an N sense combination), the resulting frequency will be 3.955 mc.; whereas, should a spectrum component subtract from an oscillator frequency (a P sense combination), the resulting frequency will be 4.045 mc. Both of these frequencies are within the pass band of the filter 84. It will be noted from Table II that the oscillator frequencies are offset from the spectrum components by 45 kc. Accordingly, unwanted crossovers between spectrum components and oscillator frequencies will not pass through the filter 84.

A pair of filters 86 and 88 are band pass filters adapted to pass different ones of the outputs of the mixer 72 within the band pass of the filter 84; the filter 86 passing the outputs of the mixer resulting from the P sense combinations and the filter 84 passing the outputs resulting from the N sense combinations.

One range of frequencies is obtained from the synthesizer when error cancellation in the P sense is utilized, and another range of frequencies is obtained from the synthesizer when the reverse or N sense of error cancellation is utilized. Still a third range of frequency is obtained where error cancellation in neither the P nor N sense or the output of the oscillator 46 is utilized. In the latter instances only the 4 mc. spectrum component which passes through the filter 84 is utilized. Ganged switches 90 and 92 which are coupled to 10 mc. and 1 mc. knobs 38 and 36 are utilized to select these three bands of frequency, namely, for the P sense of error cancellation, 2 to 38 mc.; for the N sense of cancellation, 42 to 76 mc.; and in the instance where error cancellation is not utilized 38 to 42 mc.

The output from the switch 92 is applied to a mixer 74 where it is combined with the signal from the filter 66. The frequency of the latter signal adds to the frequency of the signals from either of the filters 88 and 86 or the signal (4 mc.) which is transmitted directly from the band pass filter 84 through the switches 90 and 92 to produce an output signal which may range from 17.405 mc. to 17.495 mc. This signal is selected by a band pass filter 94.

The signal from the preset divider synthesizer 62, which may be from 2 to 2.99 mc., may be translated upwardly in frequency by deriving the sum of the 17.405 mc. to 17.495 mc. signal, and the preset divider synthesizer signal. The lower order digits of the preset divider frequency may be varied. This variation is preserved as the signals are translated upwardly in frequency. The resultant signals from 19.405 to 20.405 mc. are selected by a band pass filter 96.

The output of the band pass filter 96 is mixed in a mixer 76 with one of the outputs of the mc. synthesizer 60 (24 mc., 25 mc., 26 mc. or 27 mc.) depending upon the frequency which is selected by means of the 1 mc. and 10 mc. knobs 36 and 38. The output of the mixer which results from the addition of the mc. synthesizer frequencies and the frequencies from the band pass filter 96, are selected by means of another band pass filter 98 which passes from 43.405 mc. to 47.494 mc. The latter signals are combined with the signals from the switched crystal oscillator 46 in the final mixer 80, and an output is selected resulting from the combination of these signals in a sense opposite to the sense selected by the filters 86 and 88. For example, when output signals in the range of 2 to 37.999 mc. are desired, the crystal oscillator 46 signal frequency is subtracted from the frequency of the signal passed by the band passed filter 98. When output signals from 42 mc. to 75.999 mc. are desired, the crystal oscillator signal frequency is added to the frequency of the signal passed by the filter 98. In other words, in the range from 2 to 38 mc. output of the mixer 80 in the N sense is utilized, whereas in the range from 42 to 76 mc., the output of the mixer 80 in the P sense is utilized. From 38 to 42 mc. the switched crystal oscillator is not operative and the mixer passes the output of the one band pass filter directly.

The phase-locked loop 70 functions as a band pass filter to select the mixer outputs in the proper range of frequencies. The loop includes a variable frequency (turnable) oscillator (VFO) 100 which is tuned approximately to the desired frequency by means of switchable capacitors and inductors controlled by the 10 cm., 1 mc., 100 kc., and 10 kc., knobs 38, 36, 34 and 32. The 1 kc. knob is not utilized since the tuning to 1 kc. is accomplished automatically in the loop. The output of the oscillator 100 is compared with the mixer output in a phase detector 102. Since the phase detector 102 does not provide an output which can be passed by a low pass filter 104 when the VFO frequency selected by the knobs is outside of the desired mixer frequency 80, only the desired frequencies from the mixer 80 will result in a usable output from the low pass filter 104 which will tune the oscillator 100 exactly to the frequency selected by the knobs 30 to 38. The first injection frequency is provided by the output of the oscillator 100. The DC voltage from the low pass filter 104 may be used as a tuning voltage for the RF amplifier 11 (FIG. 1). To this end the RF amplifier 11 may include voltage variable capacitors in its tuned circuits, the capacitance of which is varied in accordance with the DC voltage from the phase-locked loop 70. The amplifiers may thereby be made to track the synthesizer frequency-wise.

By way of example of the operation of the synthesizer shown in FIG. 2, it will be assumed that the receiver is tuned by means of the knobs 30, 32, 34, 36 and 38 (FIG. 1) to receive a a signal of 14.000 mc. Accordingly, the first injection frequency desired from the synthesizer is 15.450 mc. The 10 mc. knob 38 and the 1 mc. knob 36 select the crystal and tuned circuits in the switched crystal oscillator 46 which conditions that oscillator to provide an output of 28.045 mc. It will be assumed that a frequency error of $+\Delta f$ is contained in the frequency of the oscillator 46 signal. The 28.045 mc.$+\Delta f$ output is combined in the mixer 72 with the mc. spectrum from the spectrum generator 48. The 24 mc. spectrum component subtracts from the 28.045 mc.$+\Delta f$ signal in the mixer 72 and the resultant output of 4.045 mc.$+\Delta f$ passes through the band pass filter 84.

Since the 14 mc. frequency lies within the band from 2 mc. to 38 mc., the switches 90 and 92 are conditioned by the 10 and 1 mc. knobs 38 and 36 to switch the 4.045 mc. filter 86 into the error concelling loop 68. Thus the P sense of error cancellation is selected. The positive error $+\Delta f$ is still contained in the filter 86 output and a 4.045 mc.$+\Delta f$ signal is combined with the 13.45 mc. signal from the filter 66 in the mixer 74. The band pass filter 94 which passes the band from 17.405 to 17.495 mc. allows the signal resulting from the addition of 13.45 mc. and 4.045 mc.$+\Delta f$ or 17.49 mc.$+\Delta f$ to pass therethrough.

The 17.495 mc.$+\Delta f$ signal is mixed with a 2.000 mc. signal from the pre-set divider synthesizer 62. The pre-set divider synthesizer selects the lower order digits of the frequency selected by means of the control knobs 30 to 38. Since the frequency selected is 14.000 mc., and since the lower order digits are 000, a frequency of 2.000 mc. is desired and provided by the synthesizer 62. If, for example, the lower order digits of the signal as set by the 100 kc., 10 kc. and 1 kc. knobs were 5, 2, and 5, respectively, the synthesizer 62 frequency would be 2.525 mc. Accordingly, there is a direct relationship between the signal selected by the knobs and the signal provided by the synthesizer 62. Other relationships may, alternatively, be provided depending upon the desired intermediate frequencies by suitably interconnecting the selector switching in the gate circuits and decade counter circuits of the synthesizer, as will be more apparent hereinafter from the description of the synthesizer 62.

In the example chosen for purposes of explanation, the 17.495 mc.+Δf signal is mixed with the 2 mc. signal from the synthesizer in the mixer 76. The additive combination of these signals, namely a signal at 19.45 mc.+Δf, passes through the filter 96 and is applied to the mixer 78.

As will be apparent from Table II, the 24 mc. output of the synthesizer 60 is selected when the knobs 30 to 38 are tuned to 14.000 mc. The additive combination of 24 mc. and 19.495 mc.+Δf can pass through the filter 98 as a 43.495 mc. signal. This 43.495 mc.+Δf signal is injected into the final mixer 80 along with the 28.045 mc.+Δf signal from the switched crystal oscillator 26. In order to cancel the frequency error, +Δf, the signals injected into the mixer 80 must subtract frequency-wise. This subtraction produces the required 15.450 mc. signal without frequency error. Only the 15.450 mc. mixer 80 output can actuate the phase-locked loop 70, since the variable frequency oscillator (VFO) 100 is tuned by means of the knobs 38, 36, 34 and 32 to approximately 15.450 mc. This tuning may be accomplished by switching crystals and/or tuned circuit componnets (capacitors, for example) in the (VFO) oscillator 100. Any difference between the (VFO) oscillator 100 frequency and the 15.450 mc. frequency produced by the mixer 80 results in a phase detector 102 output voltage which is filtered by the low pass filter 104 to provide a direct current error voltage which tunes the (VFO) oscillator 100 to exactly 15.450 mc. Voltage variable capacitors in the (VFO) oscillator 100 responsive to this error voltage may be used to hold the (VFO) oscillator 100 to exactly 15.450 mc. The output of the (VFO) oscillator 100 provides the first injection frequency signal. The error voltage may also be used to tune the RF amplifier 11 (see FIG. 1).

The same 28.045 mc. crystal in the switched crystal oscillator 46 may be used to obtain a number of other frequencies in the band from 42 to 76 mc. by using the opposite sense or direction of error cancellation in the loop 68; that is, the N sense of error cancellation. By way of example, a frequency of 62.000 mc. is assumed to be selected by means of the knobs 30 to 38. Accordingly, a first injection frequency of 71.450 mc. is desired from the (VFO) oscillator 100. The 10 and 1 mc. knobs 38 and 36 which are connected to the crystal oscillator 46 select the 28.045 crystal once again. Again it is assumed that a frequency error of +Δf is contained in the output of the oscillator. This oscillator output signal of 28.045 mc.+Δf is injected after amplification in the isolation amplifier 82 into the mixer 72. In this case, however, subtraction of the 28.045 mc. from the 32 mc. spectrum component produces 3.955 mc.—Δf. Thus, the sense of error contained in the oscillator 46 output is reversed. The control knobs now select the 3.955 mc. filter 88 and the band pass filter 84. The 9.955 mc. filter 88 passes the 3.995 mc.—Δf signal and that signal is injected into the mixer 74, wherein that signal is added to the 13.450 mc. signal from the filter 66 and results in a 17.405 mc.—Δf signal.

The signal, which results from the addition of 13.450 mc. and the 3.955 mc.—Δf signal, namely 17.405 mc.—Δf passes through the filter 94 and is injected into the mixer 76. Since the lower order digits of the frequency selected by the knobs 30 to 34 are 0, 0, and 0, a 2.000 mc. signal is injected into the mixer 76. The addition of the frequencies of these signals results in a 19.405 mc.—Δf signal which passes through the filter 96. The one mc. knob 36 conditions the mc. synthesizer 60 again to provide a 24 mc. signal which is injected into the mixer 78, wherein it adds to the 9.405 mc.—Δf signal. The output of the mixer which results from the addition of 19.405 mc.—Δf and the 24 mc. signal from the synthesizer 60 is 43.405 mc.—Δf. The latter signal passes through the band pass filter 98 and is injected into the mixer 80 together with the 28.045 mc.+Δf signal from the oscillator 46. When these two frequencies add in the mixer 80, the frequency error is cancelled and an output of exactly 71.450 mc. is provided. At the same time the (VFO) oscillator 100 is coarsely tuned by means of the 10 mc., 1 mc., 100 kc. and 10 kc. knobs to approximately 71.450 mc. Accordingly, the phase-locked loop 70 locks at 71.450 mc. and a first injection frequency of 71.450 mc., which has the precision of the frequency standard 44, is provided.

When a frequency in the band from 38 to 42 mc. is to be received, the crystal oscillator 46 is not utilized, rather the 4 mc. signal corresponding to the 4 mc. component of the spectrum from the generator 48, is transmitted through the filter 84 and injected into the mixer 74, and 13.350 mc. is added thereto in the mixer 74. A signal from 2.000 mc. to 2.999 mc. from the synthesizer 62 is added to the 17.450 mc. signal in the mixer 76 depending upon the lower order digits which are selected. Either 24, 25, 26 or 27 mc. is then added to the 19.450 mc. to 20.449 mc. signal from the filter 96 in the mixer 78. The desired output from 43.450 to 47.449 mc. (Band C being selected, see Table I) is passed through the mixer 80 and used to phase-lock the (VFO) oscillator 100 and the loop 70. The resulting injection frequency is then applied to the first mixer 14. Crossovers and resulting spurious signals are substantially eliminated by reason of the operation of the crystal oscillator 46 and the mixers of the loop 68 providing signals having correlated frequencies to the output mixer 80.

The pre-set divider synthesizer 62 (FIG. 2) is shown in FIG. 3. The synthesizer includes a chain of decade counters 110, 112, and 114 and counter 116 which respectively corresponds to the units, 10's, 100's, and 1000's digits of the 2 to 2.999 mc. signal which is provided by the synthesizer 62. Each of the counters 110, 112, 114 and 116 includes a plurality of flip-flops. The counters 110, 112 and 114 are decade counters and each includes 4 flip-flops. The circuits of these decade counters will be described hereinafter in connection with FIG. 4. The 1000's digit counter 116 includes two flip-flops. Gate circuits 118, 120, 122 and 124 are respectively connected to the flip-flops of the counters 110, 112, 114 and 116. One gate circuit input is provided for each flip-flop in its respective counter. Selector switching 126, 128 and 130, which may be wafer switches controlled by the 1 kc., 10 kc. and 100 kc. knobs are respectively connected to the gate circuits 118, 120 and 122. The gate circuit 124 for the divide by two counter 116 is preset to enabled condition for a count of two. The gate circuits and the selector switching therefore comprise control means for the counter chain which presets the counter to divide by a number from 2,000 to 2,999. The gate circuits are connected in tandem with each other so as to provide an output each time a count pre-selected by the control knobs 30, 32 and 34, is achieved. This count corresponds numerically to the lower digits of the frequency which the receiver (FIG. 1) is set to receive. The output of the gate circuits 118, 120, 122 and 124 is a pulse which is applied to pulse shaping circuits 132. These circuits may be amplifiers and/or one-shot multi-vibrators, which provide a sharp pulse of duration less than the reset time of the flip-flop in the decade counters 110 to 116. The output pulse from the shaping circuits 132 is applied to a pulse stretcher circuit 134 which may be a delay line or a one-shot multi-vibrator which provides an output pulse of sufficient duration to re-set each of the decade counters 110 to 116 to zero each time the pre-selected count is reached. The output of the pulse-shaping circuits is applied to a phase detector 136. The phase-detector may be a balanced type detector of known design. A tuned amplifier responsive to the pulses from the shaping circuit 132 may convert these pulses into a sinusoidal wave for application to the detector. A low-pass filter may be included in the output of the detector 136 together with suitable amplifying circuits for deriving a DC error voltage.

The other input to the phase detector is the 1 kc. reference signal from the frequency divider 45 (FIG. 1). These 1 kc. signals may be applied through an isolation amplifier in the phase detector 136. Alternatively the phase detector may be digital phase detector including a flip-flop circuit adapted to be set by pulses from the pulse-shaping circuits and re-set by pulses derived from the 1 kc. reference signal. In the event the digital phase detector is used, the tuned amplifiers, which provide sinusoidal waves, from the pulses applied thereto from the pulse-shaping circuits 132, may be eliminated. The average area under the square wave produced by the flip-flop, as it is successively set and re-set, is a function of the difference in phase betwen the pulses from the pulse-shaping circuit and the 1 kc. reference signal pulses. Accordingly, by suitably filtering the square wave output of the phase detector a DC error voltage may be derived.

The error voltage from the phase detector is applied to a variable frequency oscillator 138. This oscillator may be a tunable Colpitts or Clapp oscillator circuit generally of the type which will be described hereinafter in connection with FIG. 5. The oscillator includes a tuned circuit having voltage variable capacitors therein. The voltage on these capacitors may be changed in steps by switching different values of resistance between a source of tuning voltage and the voltage variable capacitors in the oscillator 138 tuned circuits. Resistor switching 140 is provided for that purpose. The 10 kc. control knob 32 selects the resistor in accordance with the frequency desired from the synthesizer. Capacitor switching 142 controlled by the 100 kc. knob 34 may be used to switch different values of capacitance into the tuned circuits of the oscillator in accordance with the tuning of the radio set. By means of the resistor and capacitor switching, the oscillator 138 may be tuned to approximately the desired frequency. A pulse-shaping circuit 144 which may be a clipping amplifier is provided to derive one sarp output pulse for each cycle of the oscillations from the oscillator 138. These output pulses are injected into the units decade counter of the preset divider counter chain. The synthesizer output may be derived from the output of the oscillator 138. Accordingly, it will be observed that the oscillator 138, pulse shaping circuit 144, the decade counter chain, gate circuits 118 to 124, the pulse shaping circuits 132 and the phase detector 136, define a phase-locked loop 146 wherein the output of the oscillator 138 is locked in phase with the reference signal and is at the pre-set frequency.

The operation of the pre-set divider synthesizer 62 will be better understood from the following example of the generation of a specific frequency; namely, *x*.456 mc. The .456 mc. being lower order digits of the frequency to be received, and *x* representing any higher order digit or digits from 2 to 76 mc. The decade counter chain including the counters 110 and 116 can count from 0 to 2,999. In the instant example a count of 2,456 is required. Accordingly, when (a) the units decade counter has a count of 6; (b) the tens decade counter reaches a count of 5; (c) the hundreds decade counter reaches a count of 4; and (d) the thousands decade counter 116 reaches a count of 2, number 2,456 will be stored in the counter chain. The 100 kc. knob 34, the 10 kc. knob 32, and the 1 kc. knob 30, are respectively set at 4, 5 and 6. The gate circuits 118, 120 and 122 are then respectively set or conditioned to provide an output when the count reaches 6, 5 and 4 in their respective counters 110, 112 and 114. The gate circuit 124 is normally enabled when a count of 2 is reached in its counter 116. Since the gate circuits are connected in tandem, an output must be provided by each of them. This does not occur until the count 2,456 is reached in the counter chain. On the 2,456th pulse all of the gate circuits are enabled and the pulse shaping circuit 132 activates the pulse stretcher 134 to re-set the counter.

For every 2,456 pulses from the oscillator 132, an output pulse is provided from the counter; that is the divisor of the frequency from the oscillator is 2,456. When the dividend is 2,456 mc., the counter output is 1000 pulses per second. The quotient of the division of the frequency of the oscillator by the divisor, 2,456 is exactly 1000 pulses per second when the frequency of the oscillator is exactly the desired frequency of 2.456 mc. If there is a frequency error or deviation from 2.456 mc. the quotient accordingly differs from 1000 pulses per second. The phase detector 136 recognizes this frequency error by comparison of the counter output with the reference signal of exactly 1000 cycles per second and provides an error voltage which locks the oscillator to the proper frequency and in phase with the reference signal. Since the reference signal is 1 kc., the oscillator may be used to synthesize signals which vary in frequency by 1 kc. increments. By adding additional counter stages and by reducing the frequency of the reference signal the frequencies that may be synthesized may be increased in number. For example, if the reference frequency was 100 c.p.s. and an additional decade counter stage was included, the frequencies which would be synthesized would be separated by 100 cycle steps.

FIG. 4 illustrates the decade counter 112 and its associated circuits; namely the gate circuits 120 and the selector switching 128. The other decade counters 110 and 114 are similar. The counter 116 is similar to the first two stages of the counter 112. The selector switching is shown as four single pole switches A, B, C, D. These switches may be incorporated in a wafer switch controlled by the 10 kc. knob 32.

The counter 112 itself includes four flip-flops 150, 152, 154 and 156. In the reset state, the lefthand side transistor of the flip-flops is conductive or ON and the righthand side transistor is nonconductive or OFF. The flip-flops may all be reset by a negative pulse which is applied by way of a reset line 158, which is connected to the flip-flops through the diodes 160. The input pulses from the preceding decade counter stage 110 are applied to the first of the flip-flops 150. The output of the first flip-flop 150 is obtained when that flip-flop counts two pulses. The first flip-flop 150 output is a ground pulse which is applied by way of a diode 162 to the second flip-flop 152. The second flip-flop produces an output, also a ground pulse, upon a count of four pulses, which output is applied to the third flip-flop 154. Upon a count of eight pulses, an output, also a ground pulse, is applied to the fourth flip-flop 156 from the third flip-flop 154. Upon a count of ten pulses, the output of the first flip-flop 150 is applied over a lead 164 to reset the fourth flip-flop 156 so that the latter provides an output (ground) pulse to the next counter 114. Upon reaching a count of eight, the fourth flip-flop 156 applies an inhibiting voltage through a diode 166 to the input of the second flip-flop 152. The next output (count of 10) from the first flip-flop 150 resets the fourth flip-flop 156 over line 164. Accordingly, after a count of ten all of the flip-flops 150 to 156 are reset to zero.

The gate circuits 120 include a separate circuit 168, 170, 172 and 174 for each of the flip-flop stages 150, 152, 154 and 156, respectively. The gate circuits are similar to each other and include a diode 176 connected to the side of its respective flip-flop which is conductive when a count, in the form of a binary "1" is stored therein. Another diode 178 is connected in series with the diode 176 and in back-to-back relationship therewith. The latter diode 178 is connected to an output line 180 which is common to all of the gate circuits 168 to 174, as well as the gate circuits 118, 122 and 124. The output line 180 connects the gate circuits in tandem with each other. The junction of the diodes 176 and 178 is connected to a biasing circuit including a pair of resistors 182 and 184. These resistors are connected between ground and the junction of the diodes 176 and 178. It will be understood that ground is a suitable point of reference potential and that the sources of operating voltage indicated at +B are also referenced to ground. A capacitor 186 is connected across the grounded resistor 184 for suppressing switching transients. The switches A, B, C and D are connected between the operating voltage source +B and the junction of the resistors 182 and 184. Accordingly, when the switch is closed the diodes 176 and 178 connected thereto are biased in the forward direction, whereas when the switches open these diodes 176 and 178 are connected to ground and biased in the reverse direction.

The counter 112 operates in accordance with the binary system. Accordingly the flip-flops 150, 152, 154 and 156 respectively, count the $2^0$, $2^1$, $2^2$, and $2^3$ digits of the ten pulses which are counted in the counter 112. Selection of the desired count is made by closing the proper combination of the switches A, B, C and D in accordance with the binary numbering system. Accordingly, none of the switches are closed when a zero count is selected. Only switch A is closed when the desired count is one. Switch B is closed when the desired count is two. Both switches A and B are closed for a count of three. Switch C is closed for a count of four. Both switches A and C are closed for a count of five. For a count of six, two switches B and C are closed. For a count of seven, three switches A, B and C are closed. Only switch D is closed for a count of eight. And switches A and D are closed for a count of nine.

For an example of the operation of the counter 112 and its associated gate and selector circuits 120 and 128, it will be assumed that a count of six is selected. Accordingly, switches B and C are closed, while switches A and B are open. When a count of six is reached in the counter, the righthand side transistors of stages 152 and 154 are conductive. However, the righthand side transistors of flip-flops 150 and 156 are not conductive. The diode 176 is biased in the reverse direction. Accordingly, even though the collector of the righthand side transistor in the flip-flop 150 is positive, a voltage is not applied to the output line 180 by way of the gate circuit 168. The diode 176 in the gate circuit 170 is biased in the forward direction, when switch B is closed. Accordingly, the output line 180, which is effectively returned to ground by way of a resistor in the input of the pulse shaping circuit 132 (the resistor being shown in phantom in FIG. 4), has a ground pulse applied thereto when the stage 152 stores a count. Assuming that the count was not stored in the flip-flop 152, the ground pulses would be shunted to ground through the resistors 182 and 184 and the capacitor 186 through the forwardly biased diode 178 in the gate circuit 170, if any such ground pulses were present on the output line 180. Accordingly, not only do the gate circuits generate the proper output pulses, they also prevent the transmission of an output pulse unless the selected count is reached in the counter.

When the count of six is selected, the switch C is closed and the diodes 176 and 178 in the gate circuit 172 are forward biased. If a count of four is stored in the third flip-flop 154, an output pulse is applied to the output line 180. Since the transistor on the righthand side of the flip-flop 154 is conductive, the anode of the diode 178 is connected to ground and the diode 178 is biased in the reverse direction notwithstanding the closure of the switch C. Accordingly, the ground pulse generated and applied to the output line by the flip-flop 152 is transmitted to the output of the gate circuits. Should the flip-flop 154 not store the count of four, the diode 178 would be biased in the forward direction and shunt the ground pulses from the second flip-flop 152 to ground, so that they would not be transmitted to the succeeding gate circuit 172. In other words, so long as any gate circuit is enabled and its associated flip-flop is not set, no ground pulse will appear on the line 180.

The switch D is open when the count of six is selected. Accordingly, the diodes in the gate circuit 174 are biased in the reverse direction and do not inhibit the flow of output pulses along the output line 180. The ground pulses are utilized in the pulse-shaping circuit 132 (FIG. 3) to provide the reset pulses and the pulses which are compared in the phase detector 136 with the 1 kc. reference signal from the frequency dividers.

Referring to FIG. 5 there is shown the switched crystal oscillator 46 (FIG. 1). It will be appreciated that the principles of the oscillator 46 may be used in providing the variable frequency oscillators 100 or 138 (FIGS. 2 and 3). The oscillator 46 itself includes a transistor 190 having its emitter biased in the reverse direction by voltage from a source of direct current operating voltage indicated at +B, which is applied thereto by way of a voltage divider including a pair of resistors 192 and 194. A de-coupling network including a resistor 196, a choke 198 and a capacitor 200 are also connected between +B and the emitter circuit of the transistor 190.

A frequency determining tank circuit 202 is connected between the emitter and collector of the transistor 190. The tank circuit includes a tapped inductor 209 and a capacitor 206. The emitter of the transistor 190 is connected through one of ten crystal circuits 208–*a* to 208–*j* to the tap on the inductor 209. The desired crystal is selected by means of diode switching circuits to 210–*a* to 210–*j*. The crystal circuits 208–*a* to 208–*j* include crystals 212 shunted by inductors 214. These crystals 212 in the circuits 208–*a* to 208–*j* each have a different frequency of operation. The frequency selected depends upon the setting of the 1 mc. and 10 mc. knobs 36 and 38 as explained in connection with FIG. 2. The ten frequencies that are provided separately by each of the ten crystals 212 is indicated in Table II under the heading Crystal Frequencies. Each of the crystal circuits is connected through one of the switching diodes 210 and a capacitor 216 to the emiter of the transistor 190. The switching circuits include a pair of diodes which are connected in series with each other and through a resistor to a source of operating voltage −B which normally biases these diodes in the reverse direction. Switches 218–*a* to 218–*j* are connected at the junction of the resistors and the −B supply source. Closing of the switch connects the anodes of the diodes to ground and permits the diodes to be biased in the forward direction. Accordingly depending upon which one of the switches 218–*a* to 218–*j* is closed, a different one of the crystal circuits 208–*a* to 208–*j* will be inserted between the emitter and the tap of the inductor 204.

In order to tune the tank circuit 202 to the frequency of the crystal connected thereto, a plurality of capacitors 222–*b* to 222–*j* are selectively connected across the tank circuit 202 by means of diode switching circuits 224–*b* through 224–*j*. The latter diode switching circuits each include a pair of diodes 226 and 228 which are connected in series with each other and a resistor 230 to individual ones of a plurality of switches indicated by numerals 2 through 10, respectively. These switches are ganged with corresponding switches 2 through 10 in the diode switching circuits 210–*a* to 210–*j* which control the insertion of the different crystal circuits 208–*a* to 208–*j* into the oscillator. A source of biasing voltage indicated at −B which is adapted to bias the diodes in the diode switching circuits 224–*b* to 224–*j* in the reverse direction, is connected to the junctions of the resistors 230 and the diodes 228 through other resistors 232. When one of the switches 2 to 10 is closed, the diodes associated with that switch are biased in the forward direction. The diodes associated with the open switches are biased in the reverse direction. Accordingly, only the particular one of the capacitors 222–*b* through 222–*j* which is associated with the closed switch is connected across the tank circuit 202. By actuation of the gang switches 1 through 10 by means of the 1 mc. and 10 mc. knobs 36 and 38 the desired oscillator frequency is obtained. The output signals from the oscillator may be obtained by means of a coil 234 which is coupled to the inductor 204 in the tank circuit.

It will be observed that the oscillator 46 is essentially of the Hartley type and oscillates at the frequency determined by the resonant frequency of the tank circuit 202 and the selected crystal 212.

Similar diode switching circuits may be used to insert tuning capacitors in place of crystal circuits 208–*a* to 208–*j* in order to coarsely tune the oscillator when an oscillator similar to that shown in FIG. 5 is used as the VFO in the phase-locked loop 146 and 68 (FIGS. 2 and 3). In order to fine tune these oscillators a voltage varibale capacitor may be connected across the capacitor 206 in the tank circuit 202 and tuning voltage applied thereto. The tuning voltage may be applied at the side of the voltage variable capacitor which is connected to the collector of the transistor 190. Alternatively, a pair of voltage variable capacitors may be connected in back-to-back relationship across the capacitor 206. In the latter case tuning voltages may be applied to the junction of these voltage variable capacitors.

From the foregoing description it will be apparent that there has been provided an improved communication apparatus especially suitable for radio transmitting and receiving purposes. The invention also provides improved synthesizers which are especially suitable for use in synthesizing injection frequencies for such radio sets. Although one embodiment of the communications apparatus and the synthesizers incorporated therein have been described, it will be appreciated that variations and modifications therein and in the components thereof will, undoubtedly, become apparent to those skilled in the art. Accordingly, the foregoing description should be taken, merely as illustrative and not in any limiting sense.

What is claimed is:

1. Communications apparatus for handling signals which can have any frequency in a wide range of frequencies, said apparatus comprising
(a) means for generating signals of frequencies the values of which are represented by numbers having a plurality of digits, each having an assigned order at least the lower order ones of which digits are variable in incremental steps,
(b) means for translating said generated signals in frequency for providing output signals of frequencies, the values of which are represented by numbers, the digits of which correspond to the digits of said numbers which represent said generated signals, the digits of which having higher orders than said lower order digits are independently variable of said lower digits in incremental steps,
(c) first and second channels respectively for passing signals in said wide range of frequencies and for passing signals of a certain frequency, and
(d) means responsive to said output signals and coupled to said first and second channels for translating in frequency a signal passed through one of said first and second channels into a signal adapted to be passed through the other of said first and second channels.

2. Communications apparatus for handling information signals which vary over a wide range of frequencies, said apparatus comprising
(a) a source of reference frequency signals,
(b) a variable frequency oscillator,
(c) means responsive to said reference signals for counting the oscillations provided by said oscillator and for providing a periodic output having the same frequency as said reference signals when said oscillator provides oscillations having a frequency numerically equal to a preset count having a plurality of digits, each having an assigned order,
(d) means independent of said last named means for translating said oscillations upwardly in frequency for providing output signals of different frequencies, each represented by a number having a plurality of digits, the lower order digits of which are numerically equal to corresponding digits of said preset count, and
(e) means responsive to said output signals for converting any information signal having a frequency in said wide range into an information signal of given frequency or vice versa.

3. Communications apparatus for translating radio frequency signals into an intermediate frequency signal of certain frequency or vice versa, said apparatus comprising
(a) a plurality of controls, each for tuning said apparatus to a different order digit of a multi-digit number representing the frequency of said radio frequency signals,
(b) a source of reference frequency signal,
(c) a source of oscillations adapted to be varied in frequency,
(d) means for metering the frequency of said oscillations,
(e) means responsive to those of said controls for the lower order ones of said digits for operating said metering means to provide an output having a frequency equal to the frequency of said reference frequency signals when said oscillations have a given frequency also represented by a second multi-digit number, digits of which correspond to the digits of said first named multi-digit number, the lower order digits of which second number are set by the lower order digits controls,
(f) means independent of said last named means and responsive to those of said controls for the higher order digits of said first numbers which represent said frequency of said radio frequency signals for translating said oscillations in frequency into output signals having higher frequencies than the frequency of said oscillations, and
(g) means responsive to said output signals and one of said radio frequency and intermediate frequency signals for translating the other of said last named signals in frequency to the frequency of said one of said last named signals.

4. Communications apparatus for translating a high frequency signal which can vary in frequency over a wide range of frequencies into an intermediate frequency signal of given frequency, said apparatus comprising
(a) a source of reference frequency signals,
(b) a first variable frequency oscillator,
(c) counter means for counting oscillations from said oscillator and for providing a repetitive signal having a frequency equal to the frequency of said reference signals when said first variable frequency oscillator is operating at a selected frequency equal to a selected count,
(d) means responsive to said reference signals and said repetitive signal for locking said first variable frequency oscillator to said selected frequency,
(e) means independent of said last named means for translating said first variable frequency oscillator oscillations upwards in frequency for providing output signals of frequency represented by a multi-digit number having higher order and lower order digits, the lower digits of which correspond to the lower order digits of said selected count,
(f) a second variable frequency oscillator,
(g) means responsive to said output signals and to said second variable frequency oscillator output for locking said second variable frequency oscillator in frequency to the frequency of said output signals, and
(h) means responsive to said second variable frequency oscillator output for translating one of said high frequency signals and intermediate frequency signal to the frequency of the other.

5. Communications apparatus for handling radio frequency signals which can vary over a wide range of frequencies represented by a multi-digit number, the digits of which each have an assigned order, said apparatus comprising (a) means for providing reference frequency signals of a first reference frequency and any of a plurality of other reference frequencies, (b) a first variable frequency oscillator, (c) a counter, (d) means for deriving a repetitive output signal from said counter of a frequency equal to said first reference frequency when said counter registers a preset count, said count being represented by a multi-digit number having its digits in said assigned order, the digits of which correspond to lower order digits than the digits of multi-digit numbers representing the frequency of any of said plurality of other reference frequency signals, (e) means for applying oscillations from said first oscillator to said counter for counting therein, (f) means responsive to any difference in frequency of said repetitive output signal and said first reference frequency signal for locking said first oscillator to a frequency represented by a multi-digit number having its digits in said assigned order at least the lower order digits of which first oscillator frequency number are equal to said present count, (g) means for selectively mixing different ones of said plurality of reference frequency signals and said first oscillator oscillations to provide an output signal having a frequency equal to the sum of their respective frequencies, (h) a second variable frequency oscillator, (i) means for locking said second oscillator in frequency to the output frequency of said mixing means output signal, and (j) means responsive to said output signal for converting said radio frequency signal in frequency to a given frequency signal or vice versa.

6. Communications apparatus for translating a radio frequency signal which can vary over a wide range of frequencies into a intermediate frequency signal or vice versa, said apparatus comprising (a) means for providing a plurality of reference frequency signals of different frequencies, (b) a first variable frequency oscillator for providing output oscillations over a band of frequencies, (c) counter means responsive to said output oscillations for providing a signal repetitive at the frequency of a first of said reference signals when a preset count, the lower order digits of which correspond to the lower order digits of a multi-digit number having its digits in an assigned order, which number represents the frequency of the radio frequency signal to be handled in said apparatus, is registered in said counting means, (d) means responsive to variations in frequency and phase between said repetitive signal and said first reference signal for phase-locking said first variable frequency oscillator, (e) oscillator means for providing a plurality of outputs of different frequency each of which is numerically higher than the number represented by said lower order digits alone, (f) means for translating any of said oscillator means outputs into a signal of certain frequency, (g) frequency translating means responsive to said certain frequency signal, a plurality of said reference frequency signals other than said first reference frequency signal, and said first variable frequency oscillator output oscillations for providing an output having a frequency numerically represented by a multi-digit number having its digits in said assigned order the lower order ones of which are said lower order digits of the number representing said first variable frequency oscillator output oscillation frequency, (h) means for mixing said frequency translating means output and said oscillator means output, (i) a second variable frequency oscillator, (j) means for phase locking the output signal from said second variable frequency oscillator and the output of said mixing means, which output signal results from the combination of said oscillation means output and said translating means output in a sense opposite to combination of said certain frequency signal with other signals in said translating means, in frequency with each other, and (k) means responsive to said second variable frequency oscillator output for converting one of said radio frequency signals and said intermediate frequency signals to the frequency of the other.

7. A system for synthesizing a signal having any selected one of a large number of frequencies separated from each other by equal frequency increment, over a frequency band, said system comprising:

(a) an oscillator tunable over said band for providing the signal to be synthesized;

(b) a counter having a plurality of stages for counting the cycles of frequency of said oscillator signal and having a capacity to count a number which is an integral factor of the maximum frequency in said band;

(c) gate circuits connected to each of said stages for providing an output from said counter each time said counter counts a number of cycles which is an integral factor of said selected one of said frequencies;

(d) means for resetting said counter to zero count when said output is provided; and (e) means for comparing each said output with a repetitive reference signal and for tuning said oscillation in accordance with any variation therebetween.

8. A system for synthesizing a signal having any selected one of a plurality of frequencies over a frequency band, said system comprising:

(a) an oscillator tunable over said band for providing said signal;

(b) a counter including a plurality of decade counter stages coupled to said oscillator for counting the cycles said signal;

(c) a plurality of gate circuits coupled to each stage of said counter and coupled to each other for providing an output each time said counter counts a number of said cycles of said signal which number is an integral factor of said selected frequency;

(d) means responsive to said output for resetting said counter to zero; and (e) means for comparing said output and a reference signal and for tuning said oscillator in a sense and by an amount to counteract any differences in repetition rate and phase between said output and said reference signal.

9. A system for synthesizing a signal having any of a plurality of precise frequencies spaced an integral number of cycles from each other over a frequency band, said system comprising:

(a) an oscillator tunable over said band for providing said signal;

(b) a counter including a plurality of flip-flop decade counter stages responsive to said signal for counting the cycles thereof and having a capacity which is an integral factor of the highest frequency in said band;

(c) a plurality of gate circuits each connected to a different one of the flip-flops of said counter stages and also connected in tandem to each other;

(d) control means for enabling said gating circuits to provide an output when and only when a count which is an integral factor of a selected frequency of said plurality of precise frequencies is counted by said counter;

(e) means for resetting said counter to zero in response to said output; and (f) means comparing said counter output and reference signal having a frequency, which when multiplied by said integral factor equals said highest frequency, for locking said oscillator in phase at said selected frequency.

10. A system for synthesizing a signal having any of a plurality of frequencies spaced an integral number of cycles from each other over a frequency band, said system comprising:

(a) an oscillator continuously tunable over said band for providing said signals;

(b) a counter including a plurality of flip-flop decade counter stages responsive to said signal for counting the cycles thereof and having a capacity which is an integral factor of the highest frequency in said band;

(c) a plurality of gate circuits each connected to a different one of the flip-flops of said counter stages and also connected in tandem to each other;

(d) control means for enabling said gating circuits to provide an output when and only when a count which is an integral factor of said selected frequency of said plurality of precise frequencies is counted by said counter;

(e) means operated by said control means for tuning said oscillator approximately to said one selected frequency;

(f) means for resetting said counter to zero in response to said output; and (g) means comparing said counter output and reference signal having a frequency, which when multiplied by said integral factor equals said highest frequency, for locking said oscillator in phase at said selected frequency.

11. A system for synthesizing a signal having any selected one of a large number of frequencies separated by equal frequency increments over a frequency band, said system comprising:

(a) an oscillator tunable over said band for providing said signal;

(b) a counter having a plurality of flip-flops arranged in a plurality of counter stages including decade counter stages, (c) means for applying said signal to said counter so that said counter counts the cycles of said signal;

(d) a plurality of gate circuits each connected to a different one of said counter flip-flops, said gate circuits each including (i) a pair of diodes connected between an output line and its respective flip-flop, and (ii) means for selectively biasing said diodes to enable the transmission of an output pulse along said line from said counter stages when and only when a number of cycles which is an integral factor of said one selected frequency is counted by said counter;

(e) a source of reference frequency signal having a frequency which, when multiplied said integral factor equals said one selected frequency; and (f) a phase detector coupled to said line and said source for controlling the tuning of said oscillator.

12. The invention as set forth in claim 11 wherein said diodes in each said gate circuit are connected in back-to-back relationship between said line and corresponding sides of said flip-flops, a resistor connecting the junction of said diodes to ground, and said biasing means for each said gate circuit including a separate switch element for applying a voltage to said junction for selectively biasing said diodes in the forward direction.

References Cited

UNITED STATES PATENTS 3,008,043 11/1961 Caulk -------------- 325—421

KATHLEEN H. CLAFFY, *Primary Examiner.*

R. LINN, *Assistant Examiner.*